(12) United States Patent
Sugaya et al.

(10) Patent No.: US 7,046,431 B1
(45) Date of Patent: May 16, 2006

(54) LIGHT AMPLIFIER AND LIGHT AMPLIFYING METHOD

(75) Inventors: Yasushi Sugaya, Kawasaki (JP); Miki Onaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/094,223

(22) Filed: Mar. 31, 2005

(30) Foreign Application Priority Data

Dec. 27, 2004 (JP) .............................. 2004-376115

(51) Int. Cl.
*H01S 3/00* (2006.01)
(52) U.S. Cl. .................................... 359/337.4; 359/334
(58) Field of Classification Search ............. 359/337.4, 359/337.5, 334
See application file for complete search history.

(56) References Cited

U.S. PATENT DOCUMENTS 6,583,922 B1 * 6/2003 Srikant et al. .............. 359/337
6,697,189 B1 * 2/2004 Courtois et al. .......... 359/337.1

FOREIGN PATENT DOCUMENTS

| JP | 9-179152 | 7/1997 |
| JP | 2000-98433 | 4/2000 |
| JP | 2003-131274 | 4/2003 |

* cited by examiner

*Primary Examiner*—Mark Hellner
(74) *Attorney, Agent, or Firm*—Bingham McCutchen LLP

(57) ABSTRACT

The present invention relates to a light amplifier capable of obtaining the gain and the noise characteristic required for a direct light amplification repeater in order to keep up with the trend toward higher transmission speeds. The light amplifier includes a Raman excitation section for backwardly Raman-exciting an input side optical fiber, a first discrete light amplifier capable of carrying out a discrete amplification of light from the input side optical fiber and Raman-amplified by exiting light from the Raman excitation section, a dispersion compensating fiber Raman amplifier capable of, while dispersion-compensating the light amplified by the first discrete light amplifier in a dispersion compensating fiber, Raman-amplifying the light propagating in the dispersion compensating fiber, and a second discrete light amplifier capable of carrying out a discrete amplification of the light from the dispersion compensating fiber Raman amplifier.

15 Claims, 5 Drawing Sheets

FIG. 3

| | OSNR<br>EXCITING LIGHT POWER FROM RAMAN EXCITATION SECTION:500W | OSNR<br>EXCITING LIGHT POWER FROM RAMAN EXCITATION SECTION:1W | Pp@OSNR=30dB |
|---|---|---|---|
| (a) | 29.2 dB | 31.0 dB | 650 mW |
| (b) | 28.1 dB | 32.5 dB | 680 mW |
| (c) | 30.5 dB | 32.1 dB | 400 mW |

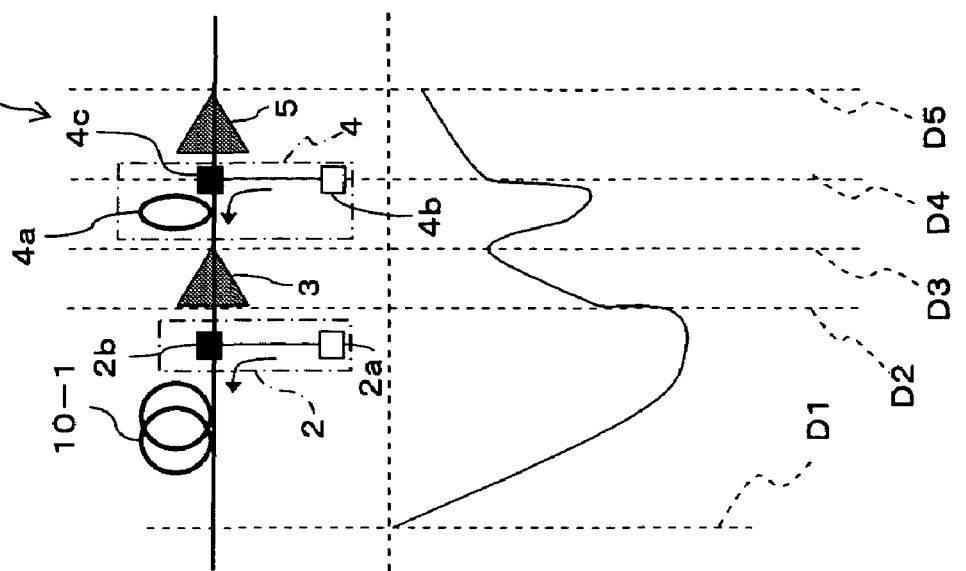
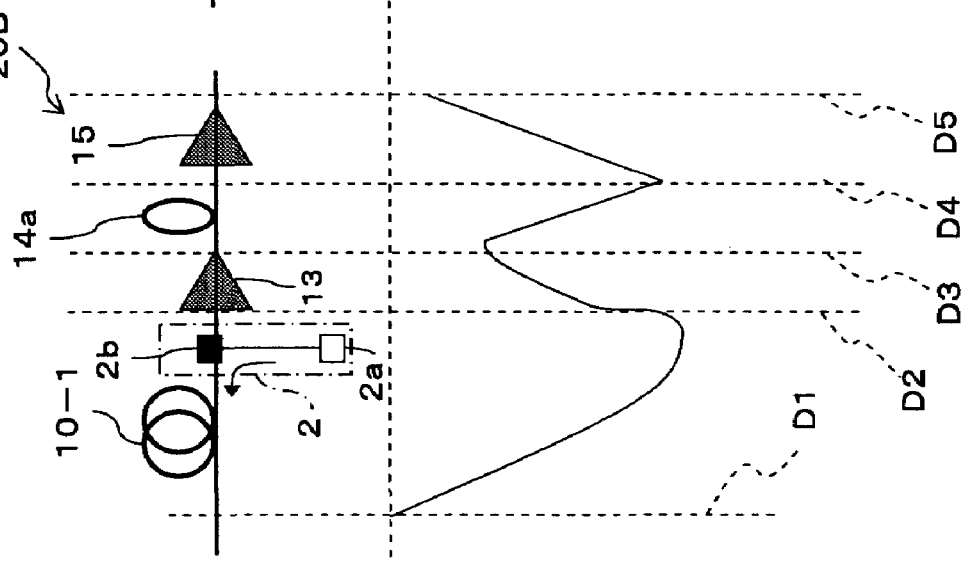
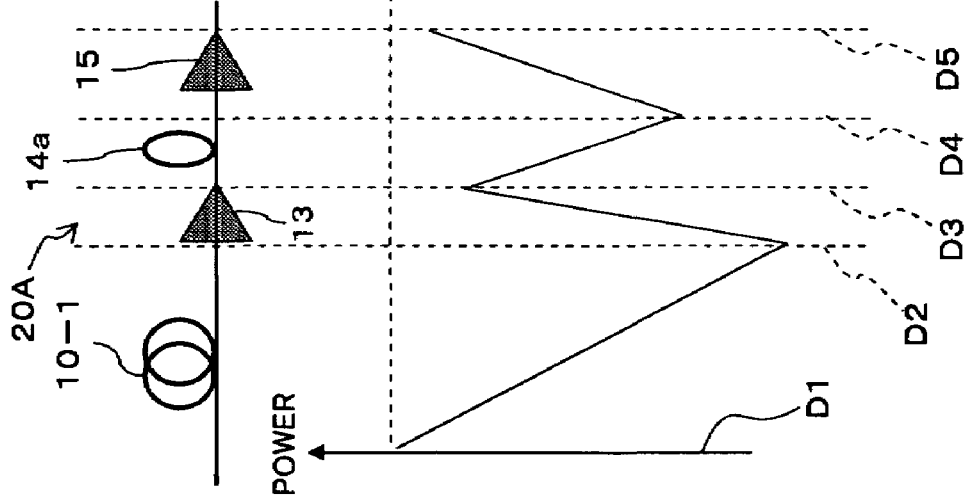

LIGHT AMPLIFIER AND LIGHT AMPLIFYING METHOD

BACKGROUND OF THE INVENTION

1) Field of the Invention

The present invention relates to a light amplifier and a light amplifying method suitable for use in an optical communication system and, more particularly, to a light amplifier and a light amplifying method suitable for use in a wavelength division multiplexing (WDM) optical communication system and, still more particularly, to a light amplifier and a light amplifying method suitable for use in carrying out a repeater amplification in a wavelength division multiplexing optical communication system.

2) Description of the Related Art

In recent years, a construction of a photonic network using the wavelength division multiplexing transmission technique is in progress for practical use. In the photonic network, by lengthening the distance across which a light signal to be repeated can transmit by being directly amplified without being converted into an electric signal, the cost of the whole optical network is reduced, that is, the cost of the network can be reduced by lengthening the regenerative repeater interval distance. Because of this, a development of lengthening the distance of light amplification repeater transmission is positively in progress.

In other words, in a trunk system network, by lengthening the regenerative repeater (repeater in which after a light signal is once converted into an electric signal and amplified, the electric signal is converted again into a light signal) interval distance, the reduction in cost of the whole network is realized. That is, the cost performance of the construction of a network is determined according to how far the regenerative repeater interval can be lengthened by interposing a function of the repeater, in which a direct light amplification is carried out by a fiber Raman amplifier, an erbium (Er) doped fiber light amplifier, or the like, on the transmission path. It is indispensably necessary to reduce noises in the repeater function for carrying out a direct light amplification in order to realize the extension of the regenerative repeater interval distance as described above.

On the other hand, the trend of the transmission speed per wavelength (channel) toward higher speeds from already existing 10 Gb/s to 40 Gb/s also contributes to the background, which requires that the noises be further reduced in the performance of a light amplification repeater in order to keep up with the trend toward higher transmission speeds as described above. In order to realize the reduction in noise of a light amplification repeater capable of keeping up with the trend toward higher transmission speeds, a technique capable of carrying out a direct light amplification with reduced noises is demanded.

A Raman amplifier described in Patent document 1 shown below is an example that realizes the reduction in noise of a light amplification repeater in order to keep up with the above-mentioned trend toward higher transmission speeds. In the Raman amplifier described in Patent document 1, a Raman amplification optical fiber and a dispersion compensating fiber (DCF) are connected in this order and input light is Raman-amplified in the Raman amplification fiber and at the same time, the dispersion of the Raman amplification optical fiber and a transmission path fiber to which the Raman amplification optical fiber is connected is compensated in the DCF. Then, in order to alleviate the loss produced by the DCF, the Raman amplifier carries out a Raman amplification of the DCF as well as a dispersion compensating fiber Raman amplifier (DCFRA).

In addition to the above, techniques relating to the present invention include those described in Patent documents 2 and 3 shown below.

[Patent document 1] Japanese Patent Laid-Open (Kokai) 2003-131274

[Patent document 2] Japanese Patent Laid-Open (Kokai) HEI 9-179152

[Patent document 3] Japanese Patent Laid-Open (kokai) 2000-98433

However, in the technique described in Patent document 1, a special optical fiber having an effective area of 30 $\mu m^2$ or less at an exciting light wavelength is used as a Raman amplification optical fiber used for Raman amplification in order to obtain a comparatively high Raman amplification efficiency.

At present, in order to reduce the noise figure (NF) to a level of 3 dB or less in a node constituting a repeater in an optical transmission path, it is necessary to carry out a distributed Raman light amplification of an input side transmission path fiber. In the technique described in Patent document 1 mentioned above, a Raman amplification is not carried out for the input side transmission path fiber, therefore, it is difficult to make the loss of the transmission path fiber appear effectively low and it is also difficult to reduce the NF below 3 dB, which is a theoretical limit that can be realized in an erbium doped optical fiber amplifier (EDFA) (refer to FIG. 5(b) shown in Patent document 1).

Moreover, in the technique described in Patent document 1 mentioned above, if an attempt is made to carry out the distributed Raman amplification of the input side transmission path fiber for the purpose of obtaining the gain obtained by the Raman amplification in the Raman amplification optical fiber used for Raman amplification, in addition to the purpose of making the loss of the transmission path fiber appear low, it becomes necessary to use an extremely large exiting light power equal to or greater than about 500 mW.

If it is intended to connect an exciting light source and an optical fiber with an easily-detachable connector in a configuration for supplying exciting light to be used as a DRA to an optical fiber, it is preferable, at present, to avoid the application of exciting light having such an extremely large power from the standpoint of the convenience of handling. In IEC61292-4TR (IEC/TR 61292-4: OPTICAL AMPLIFIERS —Part 4: Maximum permissible optical power for the damage-free and safe use of optical amplifiers, including Raman amplifiers), cautions are described in the case where exciting light having such an extremely large power is applied to a DRA. Therefore, without employing the foregoing extremely large power as an input power to a transmission path of the exciting light to be applied to the DRA, the measures to reduce noises are required.

It is needless to say that the above-mentioned technique for a direct light amplification is required to reduce noises on the assumption that the light level at the stage of being sent out to a transmission optical fiber for repeater is amplified up to a level required by the optical communication system.

Moreover, the techniques described in Patent documents 2 and 3 mentioned above also are not for disclosing a technique that realizes the gain and the noise characteristic of a light amplification repeater in accordance with the trend toward higher transmission speeds as described above.

SUMMARY OF THE INVENTION

The above-mentioned problems being taken into account, the present invention has been developed and an object thereof is to provide a light amplifier and a light amplifying method configured so as to be able to obtain the gain and the noise characteristic required for a direct light amplification repeater in order to keep up with the trend toward higher transmission speeds.

To attain the above-mentioned object, the light amplifier according to the present invention is a light amplifier interposed between an input side optical fiber and an output side optical fiber and is characterized by including a Raman excitation section for backwardly Raman-exciting the input side optical fiber, a first discrete light amplifier capable of carrying out a discrete amplification of light from the input side optical fiber and Raman-amplified by the exiting light from the Raman excitation section, a dispersion compensating fiber Raman amplifier capable of, while dispersion-compensating the light amplified by the first discrete light amplifier in a dispersion compensating fiber, Raman-amplifying the light propagating in the dispersion compensating fiber, and a second discrete light amplifier capable of carrying out a discrete amplification of the light from the dispersion compensating fiber Raman amplifier.

The level of the light outputted from the second discrete light amplifier may be set so that a first upper limit value set based on the amount of waveform deterioration caused by the nonlinear optical effect due to the output side optical fiber is not exceeded.

Further, the gain of the dispersion compensating fiber Raman amplifier may be set so that the interference noise caused by the double Rayleigh scattering is suppressed while the loss of the light due to the dispersion compensating fiber is being compensated.

The level of the light outputted from the dispersion compensating fiber Raman amplifier may be set so that a second upper limit value set based on the amount of waveform deterioration caused by the nonlinear optical effect due to the dispersion compensating fiber is not exceeded.

Further, the level of the light outputted from the second discrete light amplifier may be set so that the first upper limit value set based on the amount of waveform deterioration caused by the nonlinear optical effect due to the output side optical fiber is not exceeded, the gain of the dispersion compensating fiber Raman amplifier may be set so that the interference noise caused by the double Rayleigh scattering is suppressed while the loss of the light due to the dispersion compensating fiber is being compensated, and the level of the light outputted from the dispersion compensating fiber Raman amplifier may be set so that the second upper limit value set based on the amount of waveform deterioration caused by the nonlinear optical effect due to the dispersion compensating fiber is not exceeded.

In this case, the gain of the second discrete light amplifier may be set as a gain being amplified from the level set as a level of the light outputted from the dispersion compensating fiber Raman amplifier to the level set so that the first upper limit value is not exceeded.

Further, the gain of the first discrete light amplifier may be set so that the first discrete light amplifier amplifies the light Raman-amplified by the exciting light from the Raman excitation section up to the level of the light inputted to the dispersion compensating fiber Raman amplifier, which is derived from the gain of the dispersion compensating fiber Raman amplifier and the setting of the level of the light outputted from the dispersion compensating fiber Raman amplifier.

Preferably, the intensity of the exiting light from the Raman excitation section is set to equal or less than about 500 mW.

Further, preferably, the first discrete light amplifier and the second discrete light amplifier are constituted of a first rare earth doped light amplifier and a second rare earth doped light amplifier, respectively.

Furthermore, preferably, the light amplified by the exiting light from the Raman excitation section is wavelength division multiplexed light and when the output level per wavelength channel is equal to or greater than $-3$ dBm and the gain of the whole light amplifier is equal to or greater than 25 dB, the effective noise figure of the whole light amplifier is set to 2 dB or less.

The light amplifying method according to the present invention is characterized by including the steps of carrying out a first Raman amplification of the light propagating in the input side optical fiber, carrying out a first discrete amplification of the light inputted from the input side optical fiber and first Raman-amplified, carrying out a second Raman amplification of the light propagating in the dispersion compensating fiber while dispersion-compensating the light for which the discrete amplification has been carried out in the dispersion compensating fiber, and carrying out a second discrete amplification of the light for which the dispersion compensation and the second Raman amplification have been carried out and outputting the light to the output side optical fiber.

In this case, the level of the light obtained by the second discrete amplification is set so that the first upper limit value set based on the amount of waveform deterioration caused by the nonlinear optical effect due to the output side optical fiber is not exceeded, the gain obtained by the second Raman amplification is set so that the interference noise caused by the double Rayleigh scattering is suppressed while the loss of the light due to the dispersion compensating fiber is being compensated, and the level of the light obtained by the second Raman amplification is set so that the second upper limit value set based on the amount of waveform deterioration caused by the nonlinear optical effect due to the dispersion compensating fiber is not exceeded.

Preferably, the gain obtained by the second discrete amplification is set as a gain being amplified from the level set as a level of the light obtained by the second Raman amplification to the level set so that the first upper limit value is not exceeded.

The gain obtained by the first discrete amplification may be set so that the level of the light obtained by the first Raman amplification is amplified up to the level of the light inputted to the dispersion compensating fiber Raman amplifier, which is derived from the gain obtained by the second Raman amplification and the setting of the level of the light obtained by the Raman amplification.

Preferably, the intensity of the exciting light for the first Raman amplification is set to equal or less than about 500 mW.

The output of the exciting light in the Raman excitation section may be controlled to be constant, the power of the output light obtained by the first discrete amplification may be controlled to be constant, the power of the output light obtained by the second Raman amplification may be controlled to be constant, and the power of the output light obtained by the second discrete amplification may be controlled to be constant.

As described above, the light amplifier of the present invention includes the Raman excitation section connected to the input side optical fiber and backwardly Raman-exciting the input side optical fiber, the first discrete light amplifier capable of carrying out a discrete amplification of the light from the input side optical fiber and Raman-amplified by the exiting light from the Raman excitation section, the dispersion compensating fiber Raman amplifier capable of, while dispersion-compensating the light amplified by the first discrete light amplifier in the dispersion compensating fiber, Raman-amplifying the light propagating in the dispersion compensating fiber, and the second discrete light amplifier capable of carrying out a discrete amplification of the light from the dispersion compensating fiber Raman amplifier, therefore, there is an advantage that the gain and the noise characteristic can be obtained, which are required for the direct light amplification repeater in order to keep up with the trend toward higher transmission speeds.

BRIEF DESCRIPTION OF THE DRAWINGS

FIG. 2, FIG. 3, and FIG. 4 (a) to FIG. 4 (c) are each diagrams for explaining the operational effect of a light amplifier according to an embodiment of the present invention.

DESCRIPTION OF THE PREFERRED EMBODIMENTS

The embodiments of the present invention are explained below with reference to drawings.

In addition to the above-mentioned objects of the present invention, other technical problems and means to solve the technical problems and its operational effect will be cleared in the description of the embodiments disclosed below.

[A] Description of an Embodiment of the Present Invention

[A1] Configuration

Figure 1:
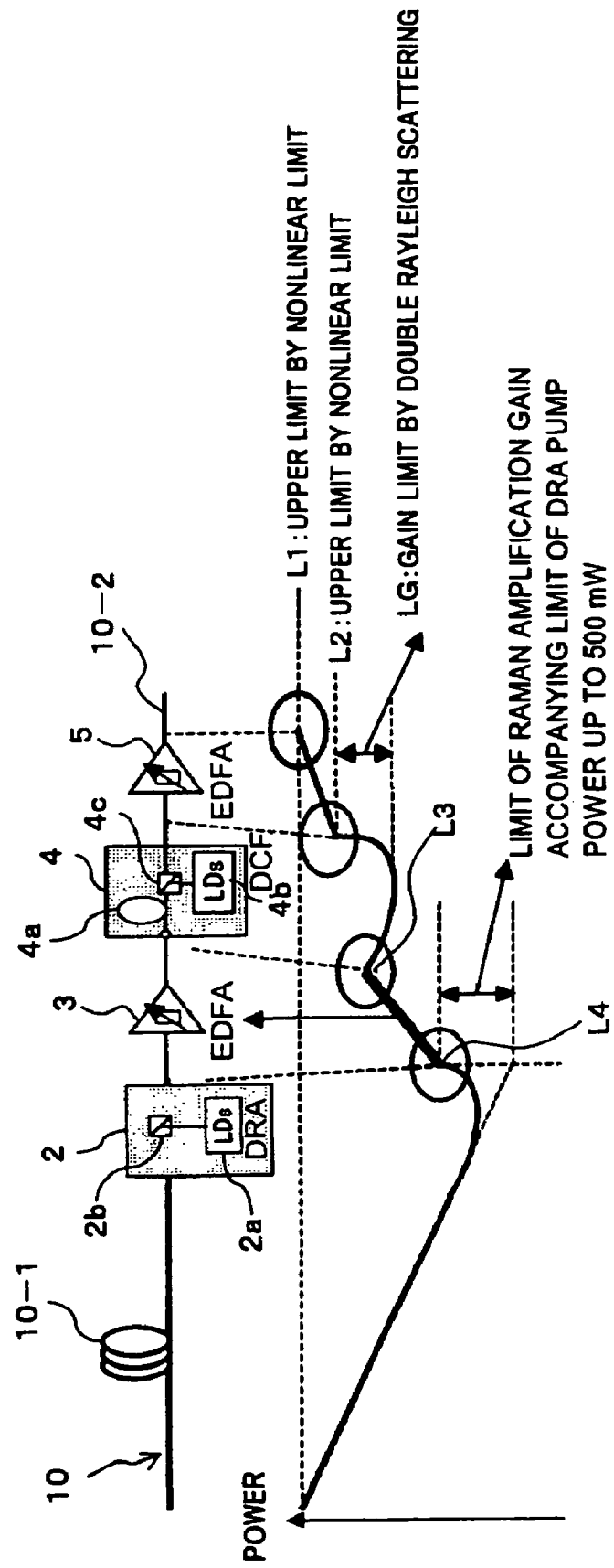
FIG. 1 is a diagram showing a light amplifier according to an embodiment of the present invention.

FIG. 1 is a diagram showing a light amplifier according to an embodiment of the present invention. A light amplifier 1 shown in FIG. 1 is applied as, for example, a repeater node interposed on an optical transmission path 10 and carries out a direct light amplification repeater of a light signal propagating in the optical transmission path 10. In other words, the light amplifier 1 as a repeater node carries out the direct light amplification of a light signal inputted from an input side optical fiber 10-1 constituting the optical transmission path 10 and sends out the light signal to an output side optical fiber 10-2 constituting the optical transmission path 10.

The light amplifier 1 includes a Raman excitation section 2, a first erbium doped optical fiber amplifier 3, a dispersion compensating fiber Raman amplifier 4, and a second erbium doped optical fiber amplifier 5.

Here, the Raman excitation section 2, which includes a Raman exciting light source 2a and an optical member 2b for inserting the Raman exciting light from the Raman exciting light source 2a into the input side optical fiber 10-1, supplies the exciting light from the Raman exciting light source 2a to the input side optical fiber 10-1, thereby enabling the light (for example, wavelength division multiplexed signal light) propagating in the input side optical fiber 10-1 to be Raman-amplified by backward excitation.

By carrying out a Raman amplification using the input side optical fiber 10-1 as an amplification medium in this way, the loss of the input side optical fiber 10-1 can be made to appear effectively low as described above, therefore, the NF of the node can be made lower than 3 dB, which is a theoretical limit that can be realized by the erbium doped light amplifier.

The exciting light, which is to be outputted from the Raman exciting light source 2a of the Raman excitation section 2, is configured so that light having a wavelength in accordance with the wavelength band of input light can be outputted, and the exciting light power can be set to about 500 mW, which is specified as a conformity index in Class 3B of the laser safety standards. In other words, setting the exciting light power so as to satisfy the conformity index in Class 3B of the laser safety standards can contribute to the convenience in handling.

The level of the light from the transmission path fiber 10-1 differs in loss component depending on the length etc. of the transmission path fiber 10-1 and the power of the exciting light to be supplied to the transmission path fiber 10-1 is set to about 500 mW in the Raman excitation section 2, therefore, the level of the light Raman-amplified by the Raman excitation section 2 changes depending on the loss in the transmission path fiber 10-1.

The first erbium doped light amplifier 3 is an optical fiber amplifier that functions as a first discrete light amplifier capable of carrying out a discrete amplification of the light (signal light) from the transmission path fiber 10-1 and Raman-amplified by the exciting light from the Raman excitation section 2 and this first erbium doped light amplifier 3 is configured so as to be capable of receiving the light Raman-amplified through the transmission path fiber 10-1 and setting a gain so that the light can be amplified up to the target level, to be described later.

The dispersion compensating fiber Raman amplifier (DC-FRA) 4 is capable of Raman-amplifying the light amplified by the first erbium doped light amplifier 3 while carrying out dispersion compensation and includes a dispersion compensating fiber 4a connected to the erbium doped light amplifier 3 and at the same time, a Raman exiting light source 4b capable of emitting Raman exciting light for the dispersion compensating fiber 4a and an optical member 4c for inserting the Raman exiting light emitted from the Raman exciting source 4b into the dispersion compensating fiber 4a, for example, from the back side.

The dispersion compensating fiber 4a compensates the dispersion in the transmission path fiber 10-1. There is the possibility that the length of the transmission path fiber 10-1 constituting the input side optical fiber of the light amplifier 1 differs depending on the installation position thereof, therefore, the dispersion compensating fiber 4a is configured so as to be capable of carrying out an optimum dispersion compensation based on the dispersion characteristic obtained from the length of the transmission path fiber 10-1.

Then, into the dispersion compensating fiber 4a, the Raman exciting light emitted from the above-mentioned Raman exciting light source 4b is inserted through the optical member 4c, therefore, also the light (signal light) propagating in the dispersion compensating fiber 4a is Raman-amplified by the exciting light from the Raman exciting light source 4b. By the way, the exciting light from the Raman exiting light source 4b allows light having a wavelength in accordance with the wavelength of the light inputted through the transmission path fiber 10-1 and the first erbium doped light amplifier 3 to be outputted, similarly to the exiting light in the Raman excitation section 2.

The upper limit value, which is a target value as will be described later, of the output level and the gain at the dispersion compensating fiber Raman amplifier 4 is set, therefore, it is also possible to uniquely derive the input level to the dispersion compensating fiber Raman amplifier 4 as a target level. By the way, the output target level of the above-mentioned first erbium doped light amplifier 3 corresponds to the target value of the input level of the dispersion compensating fiber Raman amplifier 4 described above.

Further, the second erbium doped light amplifier 5 is an optical fiber amplifier that functions as a second discrete light amplifier capable of carrying out a discrete amplification of the light (light signal) from the dispersion compensating fiber Raman amplifier 4 and the light amplified in the second erbium doped light amplifier 5 can be sent out through the transmission path fiber 10-2, that is, the output side optical fiber.

The upper limit value, which is a target value, is also set for the level of the light amplified in and outputted from the second erbium doped light amplifier 5 and the gain is determined in relation to the upper limit value as the output of the dispersion compensating fiber Raman amplifier 4 described above. In other words, the second erbium doped light amplifier 5 is configured so as to be capable of setting the gain to allow the operation with the determined gain.

The above-mentioned first and second erbium doped light amplifiers 3 and 5 are both configured so as to include the excitation section for exciting an optical fiber by inserting exciting light as well as the optical fiber, not shown schematically, but the optical fibers constituting the first and second erbium doped light amplifiers 3 and 5 can be constituted of optical fibers doped with rare earth elements other than erbium.

[A2] About the output level and the setting of the gain of the first and second erbium doped light amplifiers 3 and 5 and the dispersion compensating fiber Raman amplifier 4 constituting the light amplifier 1.

By the way, in the light amplifier 1 according to the present embodiment, as a configuration characteristic to the present invention, the above-mentioned first erbium doped light amplifier 3, dispersion compensating fiber Raman amplifier 4, and second erbium doped light amplifier 5 are arranged in this order from the input side of light as shown in FIG. 1 and at the same time, the respective gains can be set as an example.

In the first place, in order to make the loss of the input side optical fiber 10-1 appear effectively low, it is preferable to provide a function to Raman-excite the input side optical fiber 10-1 on the input side of the light from the optical fiber 10-1 rather than arranging a discrete light amplifier such as an erbium doped light amplifier because the loss of the transmission path on the side in which the light has been transmitted can be compensated by making low noises.

On the other hand, in the repeater stage in the optical transmission path 10, it becomes necessary to compensate the wavelength dispersion of the light in the input side optical fiber 10-1 for the receiving side to properly receive the light signal, therefore, the dispersion compensating fiber 4a is provided in the light amplifier 1 interposed on the optical transmission path 10. Then, since the dispersion compensating fiber 4a itself is a medium that produces a comparatively large loss, the light amplifier 1 compensates the loss produced in the dispersion compensating fiber 4a by Raman-amplifying the dispersion compensating fiber 4a as the DCFRA 4.

Further, it is preferable to send out light with power as high as possible as an output of the light amplifier 1 at the stage of sending out the light to the output side optical fiber 10-2 because this leads to lengthening the transmission length, however, it is still necessary to set the level of the light below the upper limit value at which the nonlinear effect begins to come into play at the output side optical fiber 10-2. This is because if the nonlinear effect comes into play in the light inputted to the output side optical fiber 10-2, waveform deterioration is caused in the light signal propagating in the output side optical fiber 10-2.

Therefore, as shown in FIG. 1, the first upper limit value L1, which is set based on the amount of waveform deterioration caused by the nonlinear optical effect due to the output side optical fiber 10-2, is set as a target value for the power of light at the stage of sending out the light to the output side optical fiber 10-2. In other words, by making it possible to send out a light signal to the output side optical fiber 10-2 at the level of the first upper limit value L1, the transmission distance can be lengthened without the need to take into account the influence of the waveform deterioration caused by the nonlinear optical effect.

However, if the above-mentioned L1 is set as a target value for the power of light at the stage of sending out the light to the output side optical fiber 10-2, a configuration in which the dispersion compensating fiber 4a constituting the DCFRA is connected to the output side optical fiber 10-2 is not possible. This is because there exists a difference between the above-mentioned first upper limit value L1 and the output upper limit value set based on the amount of waveform deterioration caused by the nonlinear effect in the dispersion compensating fiber 4a.

That is, since the core diameter of the dispersion compensating fiber 4a needs to be made smaller than that of the input side and output side optical fibers 10-1 and 10-2, the intensity of the light confined to and transmitted in the core of the dispersion compensating fiber 4a becomes greater than that in the output side optical fiber 10-2 (that is, the energy density in the DCRFR4 becomes greater than that in the output side optical fiber 10-2), and the influence of a difference of a refractive index between the dispersion compensating fiber 4a and the output side optical fiber 10-2 also leads to that the upper limit of the level of the output light at which the nonlinear effect comes into play becomes lower in the dispersion compensating fiber 4a than in the output side optical fiber 10-2.

Originally, the nonlinear optical effect of the DCFRA 4 is more likely to occur as the integral of the change in light level between the input and the output becomes greater, however, it is substantially possible to make a judgment based on the magnitude of the output light level. In other words, the greater the output light level is, the greater the amount of waveform deterioration caused by the nonlinear optical effect becomes relatively. As for the nonlinear effect of the output side optical fiber 10-2, it is also possible to make a judgment based on the magnitude of the input light level (or the light level of the output of the light amplifier 1) to the output side optical fiber 10-2.

As described above, it is preferable to raise the level at which the light is to be sent out to the output side optical fiber 10-2 as output light to a level toward the maximum value (nonlinear limit of the output side optical fiber) L1 as a target at which the influence of the nonlinear optical effect that the light signal propagating in the output side optical fiber 10-2 undergoes can be ignored by the receiving side, however, a difference is bound to be made between the nonlinear limit L1 of the output side optical fiber 10-2 and the nonlinear limit of the light level of the output light of the DCFRA 4.

Therefore, the target value of the output light level of the dispersion compensating fiber 4a is set to a second upper limit value (that is, the nonlinear limit of the dispersion compensating fiber 4a) L2 at which the influence of the nonlinear optical effect that the light signal propagating in the dispersion compensating fiber 4a undergoes can be ignored and at the same time, in order to remove the difference in light level between the above-mentioned L2 and L1, the second erbium doped light amplifier 5, that is, a discrete light amplifier, is interposed between the dispersion compensating fiber 4a and the output side optical fiber 10-2.

The gain of the second erbium doped light amplifier 5 is set so that the first upper limit value, which is the target value of the input level of the output side optical fiber 10-2, can be set as an output level when the second upper limit value, which is the output target value of the above-mentioned dispersion compensating fiber 4a, is set as an input level. At this time, the gain should be set while the optical loss due to the respective connections between the dispersion compensating fiber 4a and the second erbium doped light amplifier 5 and between the output side optical fiber 10-2 and the second erbium doped light amplifier 5 is taken into account.

In the dispersion compensating fiber 4a that carries out the Raman amplification as the DCFRA 4, crosstalk light caused by the double Rayleigh scattering produces interference noises. The interference noise increases correspondingly as the gain of the Raman amplification becomes greater. In order to suppress the interference noise, it is necessary to impose limitations to the gain of the DCFRA itself as well. That is, the gain of the DCFRA 4 is set to a gain LG shown in FIG. 1 in order to suppress the interference noise caused by the double Rayleigh scattering while compensating the optical loss due to the dispersion compensating fiber 4a.

If the amount of compensation necessary to dispersion-compensating the input side optical fiber 10-1 is found, the length of the dispersion compensating fiber 4a can be determined accordingly, therefore, the amount of loss of the dispersion compensating fiber 4a is determined uniquely. Because of this, if the output light level of the DCFRA 4 is set so as to be the nonlinear limit L2 and at the same time, the gain is set so as to be LG, the light level to be inputted to the DCFRA 4 can also be determined uniquely as a target value L3.

At present, however, a difference is made between the value to be set as the target value L3 of the light level inputted to the DCFRA 4 and a light level L4 to be inputted to the light amplifier 1 from the input side optical fiber 10-1 even if the light to be inputted is such one that has been Raman-amplified by the exiting light from the Raman excitation section 2. This is because, since limitations are imposed on the exciting light level of the Raman excitation section 2 as described above, the Raman amplification by the Raman excitation section 2 can not be raised up to such a level given as the target value L3 of the level of light to be inputted to the DCFRA 4.

By designing a configuration so that by connecting the DCFRA 4 to the post stage of the Raman excitation section 2, the light Raman-amplified by the Raman excitation section 2 is amplified by the DCFRA 4, and at the same time, by limiting the gain of the DCFRA 4 to the above-mentioned LG, it may be thought possible to cope therewith by increasing the gain of the second erbium doped light amplifier 5 although the output of the DCFRA 4 does not reach the target value L2.

Figure 2:
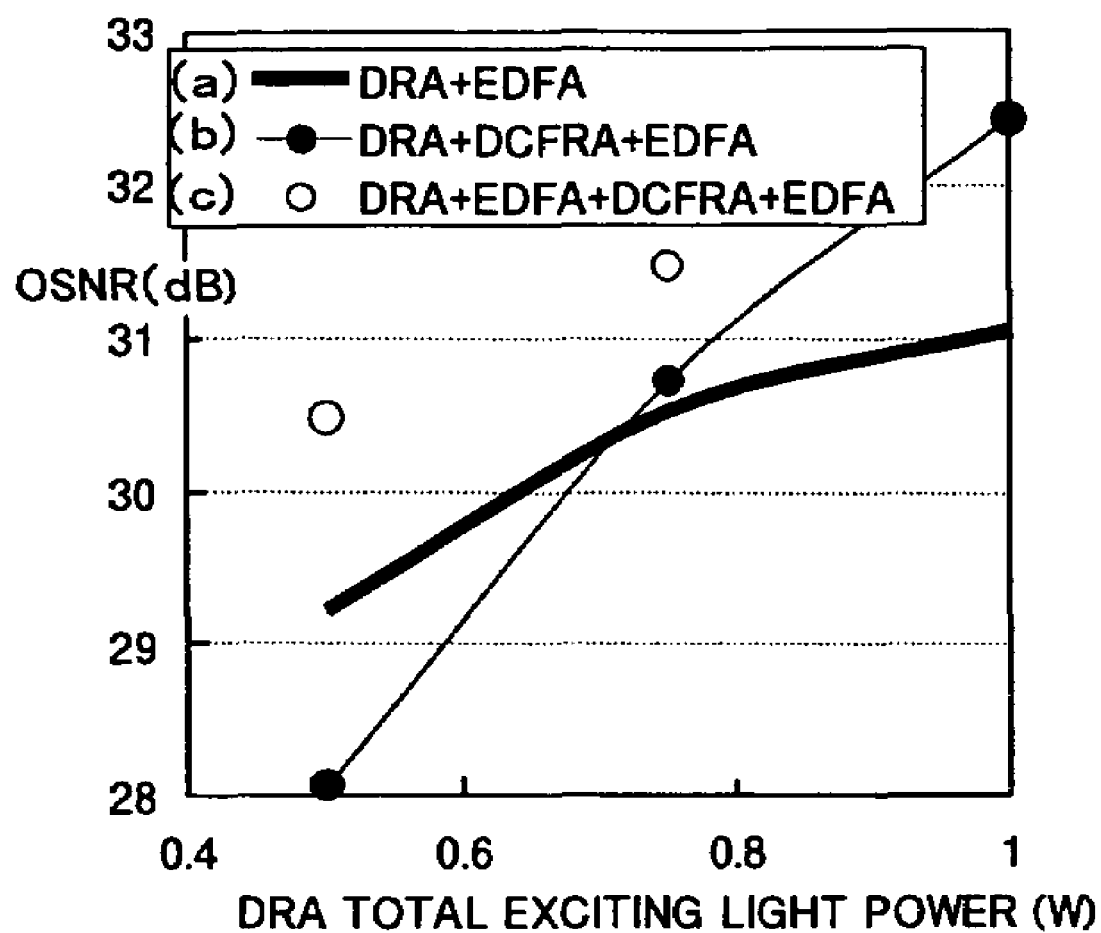

In this configuration, however, if, for example, as shown in FIG. 2 and FIG. 3 (b), the exciting light power of the Raman excitation section 2 is set to about 500 mW as described above, the noise characteristic is deteriorated. It is supposed that the deterioration of the noise characteristic is mainly caused by the fact that the DCFRA 4 is operated at comparatively low input/output light levels. Therefore, in order to improve the noise characteristic, it is preferable to operate the DCFRA 4 in the region where the input/output light level is as high as possible without changing the gain thereof.

In other words, in order to improve the noise performance of the whole light amplifier 1, it becomes necessary to set the input light level as high as possible in a range where the nonlinear limit of the output light is not exceeded while limiting the gain to LG so that the interference noise caused by the double Rayleigh scattering is suppressed as described above. Doing so incurs occurrence inevitably of a difference between the level of light inputted to the light amplifier 1 from the input side optical fiber 10-1 and the input level to the DCFRA 4.

In the present invention, in order to remove the difference between light levels described above, the first erbium doped light amplifier 3 is provided between the Raman excitation section 2 and the DCFRA 4. At this time, the gain of the first erbium doped light amplifier 3 is set so that the light (its level is L4 in FIG. 1) Raman-amplified by the exciting light from the Raman excitation section 2 is amplified up to the target value level L3 of the light to be inputted to the above-mentioned DCFRA 4. In this case also, the gain should be set while the optical loss due to the respective connections between the Raman excitation section 2 and the first erbium doped light amplifier 3 and between the dispersion compensating fiber 4a and the first erbium doped light amplifier 3 is taken into account.

[A3] Operational Effect

In the light amplifier 1 thus configured, the light (signal light) propagating in the input side optical fiber 10-1 enables the loss of the input side optical fiber 10-1 to be effectively reduced by carrying out the first Raman amplification using the exiting light from the Raman excitation section 2.

Then, the light from the input side optical fiber 10-1 for which the above-mentioned first Raman amplification has been carried out undergoes a discrete amplification in the first erbium doped light amplifier 3 and is amplified up to the target value level of the light to be inputted to the DCFRA 4.

In the DCFRA 4, the light for which a discrete amplification has been carried out in the first erbium doped light amplifier 3 undergoes the second Raman amplification at the above-mentioned gain LG while being dispersion-compensated, and the light having the light level of the second target value L2, which is the upper limit value at which the influence of the nonlinear optical effect does not substantially come into play in the dispersion compensating fiber 4a, is outputted.

Further, in the second erbium doped light amplifier 5, the light for which the second Raman amplification has been carried out in the DCFRA 4 undergoes a discrete amplification so to be amplified from the above-mentioned second target value L2 up to the first target value L1, which is the upper limit value at which the influence of the nonlinear optical effect does not substantially come into play in the output side optical fiber 10-2, and the amplification result is sent out to the output side optical fiber 10-2 as an output of the light amplifier 1.

As described above, when the amplifier is configured by connecting the Raman excitation section 2, the DCFRA 4, and the second erbium doped light amplifier 5 in this order from the light input side, the optical signal to noise ratio (OSNR) of the whole amplifier is as shown in FIG. 2 and FIG. 3 (b). In contrast to this, according to the configuration of the light amplifier 1 of the present embodiment, the OSNR of the light amplifier 1 is as shown in FIG. 2 and FIG. 3 (c) and it is possible to considerably improve the OSNR when the exciting light power of the Raman excitation section 2 is set to 500 mW.

FIG. 2 and FIG. 3 (a) show the OSNR when the dispersion compensating fiber 4a is not Raman-amplified in the configuration of the light amplifier 1 of the present invention and it is needless to say that the configuration of the present invention in which the dispersion compensating fiber 4a is Raman-amplified can improve the OSNR, that is, the noise characteristic.

Further, as shown in FIG. 3, as for the exiting light power from the Raman excitation section 2 which can put the OSNR to 30 dB, only in the case of the light amplifier 1 of the present embodiment, the value (about 400 mW) that satisfies the conformity index in Class 3B of the above-mentioned laser safety standards is realized.

In other words, by improving the noise characteristic expressed by the above-mentioned OSNR, it is also possible to lengthen the distance (repeater interval distance) per span across which transmission is possible.

Here, the distance across which a light signal can be transmitted without interposing the regenerative repeater function on the transmission path is given by the following expression (1). However, the value of the OSNR used here is a true value and the distance per span means an interval of a transmission path on which no repeater having a direct light amplification function is interposed.

$$\text{Distance}=(\text{OSNR per repeater/permissible OSNR at a receiving section})\times\text{distance per span}) \qquad (1)$$

In other words, if it is assumed that the permissible OSNR at a device (receiving section) for receiving a light signal is a fixed value and the distance per span is a condition given in accordance with an actual transmission path, the measure to lengthen the transmission distance is to increase the OSNR per repeater.

On the other hand, the relationship between the noise figure and the OSNR of a repeater is given by the following expression (2).

$$\text{OSNR}=(\text{transmission path input power})/\{(\text{loss per unit span})\times(\text{noise figure})\times(\text{photon energy in the receiving band})\} \qquad (2)$$

The photon energy in the receiving band and the loss per span are conditions given in accordance with an actual transmission path and from the above-mentioned expressions (1) and (2), so it is eventually found that the distance that can be reached is in inverse proportion to the noise figure per repeater. For example, in order to double the transmission distance, it is necessary to halve the noise figure, that is, to reduce the noise figure by 3 dB.

Therefore, in order to lengthen the transmission distance, it becomes necessary to reduce noises in a repeater. In particular, when a light amplifier is mounted as a repeater for carrying out repeater between existing transmission paths, the distance per span is given in accordance with an actual transmission path, therefore, the provision of a light amplifier capable of increasing the OSNR contributes to the extension of the transmission-possible distance obtained from the above-mentioned expression (1), which is extremely useful.

The application of the light amplifier 1 according to the present embodiment as a repeater enables the noise characteristic of the repeater to be improved by reducing noises, which can contribute to the extension of the transmission distance.

Moreover, as shown in FIG. 4, the application of the configuration of the light amplifier 1 of the present embodiment to a repeater is more useful as shown below compared to the case of the application of the configuration of other light amplifiers to a repeater.

FIG. 4 (a) is a level diagram when a light amplifier 20A is configured, as a repeater, by using an input side erbium doped light amplifier (EDFA) 13, a dispersion compensating fiber (DCF) 14a, and an output side erbium doped light amplifier (EDFA) 15. FIG. 4 (b) is a level diagram when a light amplifier 20B is configured, as a repeater, by using a Raman excitation section 12, the input side erbium doped light amplifier 13, the dispersion compensating fiber 14a, and the output side erbium doped light amplifier 15. FIG. 4 (c) is a level diagram when the light amplifier 1 according to the present embodiment is configured as a repeater.

In FIG. 4 (a) to FIG. 4 (c), a change in level of light propagating in the input side optical fiber 10-1 is shown in an interval from D1 to D2, a change in level ranging from the input terminal (D2) as a repeater to the output terminal (D3) of the input side erbium doped light amplifier 13 or the first erbium doped light amplifier 3 is shown in an interval from D2 to D3, a change in level ranging from the above-mentioned D3 to the output terminal (D4) of the DCF 14a or the DCFRA 14 is shown an interval from D3 to D4, and a change in level ranging from the above-mentioned D4 to the output terminal (D5) of the output side erbium doped light amplifier 15 or the second erbium doped light amplifier 5 is shown in an interval from D4 to D5.

From comparison between the configuration shown in FIG. 4 (a) and the configuration shown in FIG. 4 (b), it is found that the power in the vicinity of the input side as a repeater, that is, at the input section (D2) to the input side erbium doped light amplifier 13, is more improved in the configuration shown in FIG. 4 (b) in which the input side optical fiber 10-1 is Raman amplified, than in the configuration shown in FIG. 4 (a). Moreover, from comparison between the configuration shown in FIG. 4 (b) and the configuration shown in FIG. 4 (c), it is found that the light power is more improved in the vicinity of the input terminal (D4) to the second stage erbium doped light amplifier 15.

As a result, as shown in FIG. 4 (c), it is possible for the configuration of the light amplifier 1 according to the present embodiment to provide a comparatively small change in level ranging from the input side (D2) as a repeater to the output side (D5) and the best noise performance that changes at a comparatively high level.

Moreover, in the case where the light amplifier 1 of the present invention is applied as a direct light amplification repeater in a wavelength division multiplexing optical communication system, when the output level per channel is set to −3 dBm or greater and the gain of the light amplifier 1 is set to 25 dB or greater, the effective noise figure of the whole light amplifier 1 can be set to 2 dB or less.

In finding the above-mentioned effective noise figure of the whole light amplifier 1, the effective noise figure of a part to be Raman-amplified using the input side optical fiber 10-1 as an amplification medium can be defined as the following expression (3).

$$NF_{eff} = P_{ase}/(Pout_{pump\text{-}on}/Pout_{pump\text{-}off} \times \text{photon energy in the receiving band}) \quad (3)$$

Therefore, the effective noise figure can be determined based on the relationship between the Raman gain ($Pout_{pump\text{-}on}/Pout_{pump\text{-}off}$) and the amplified spontaneous emission (ASE) power ($P_{ase}$).

As described above, according to one embodiment of the present invention, the light amplifier includes the Raman excitation section 2 connected to the input side optical fiber 10-1 and backwardly Raman-exciting the input side optical fiber 10-1, the first discrete light amplifier 3 capable of carrying out the discrete amplification of the light from the input side optical fiber 10-1 and Raman-amplified by the exiting light from the Raman excitation section 2, the dispersion compensating fiber Raman amplifier capable of, while dispersion-compensating the light amplified by the first discrete amplifier 3 in the dispersion compensating fiber 4a, Raman-amplifying the light propagating in the dispersion compensating fiber 4a, and the second discrete light amplifier 5 capable of carrying out the discrete amplification of the light from the dispersion compensating fiber Raman amplifier 4, therefore, there is an advantage that the gain and the noise characteristic can be obtained, which are required for the direct light amplification repeater in order to keep up with the trend toward higher transmission speeds.

[A4] Others

Despite the above-mentioned embodiments, there can be various modifications of the embodiments without departing from the scope of the present invention.

Figure 5:
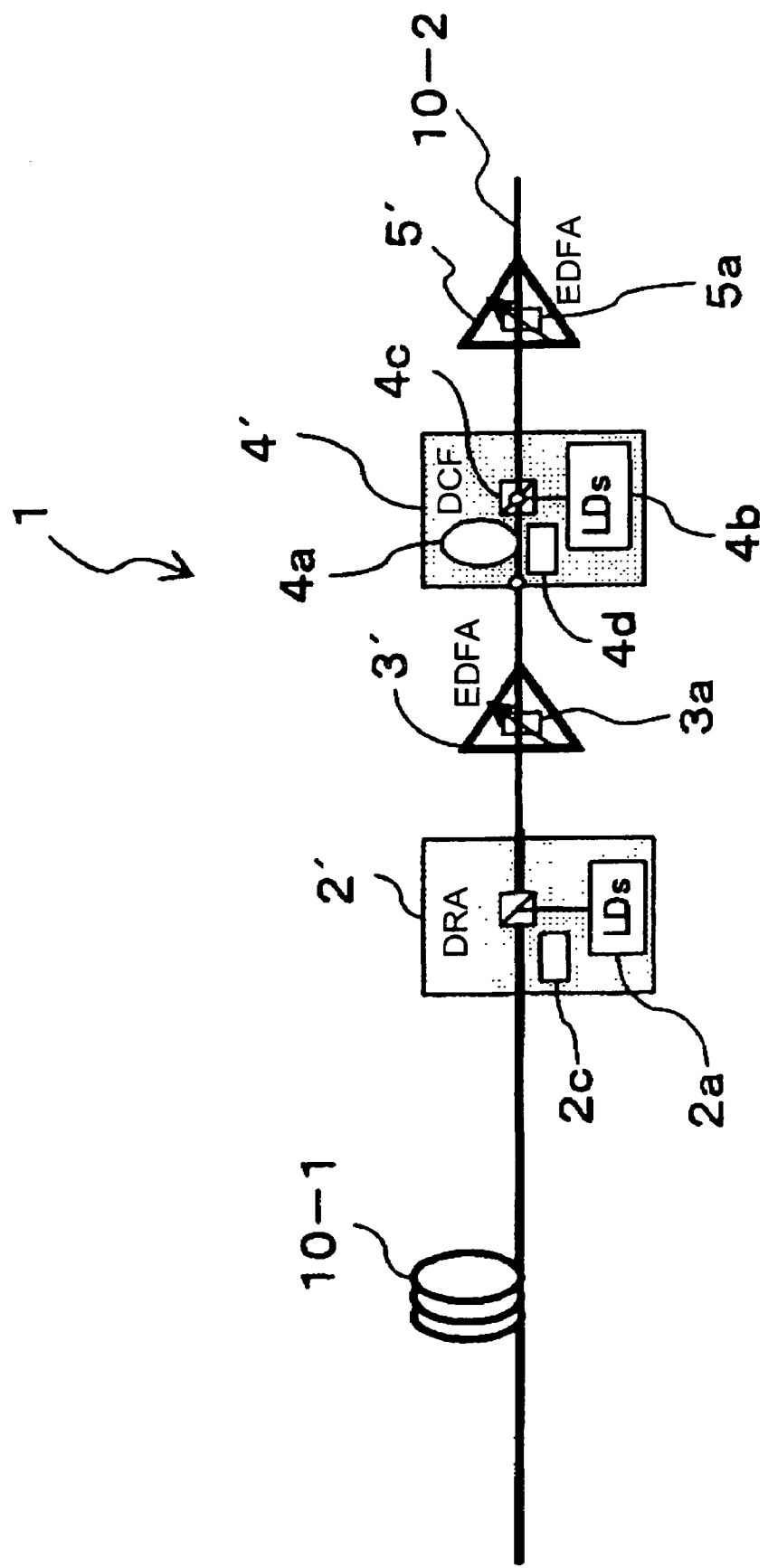
FIG. 5 is a diagram showing a modification of an embodiment of the present invention.

For example, in order to stabilize the amplification characteristic and the output light of the light amplifier 1, as shown in FIG. 5, it may be possible to provide a constant exciting light control section 2c for controlling the output of exciting light to be supplied to the input side optical fiber 10-1 to be constant as a Raman excitation section 2', to provide a constant output power control section 3a for controlling the output power to be constant as a first erbium doped light amplifier 3', to provide a constant output power control section 4d for controlling the output power to be constant as a DCFRA 4', or to provide a constant output power control section 5a for controlling the output power to be constant as a second erbium doped light amplifier 5'.

Due to the disclosure of the embodiments described above, it is possible to manufacture an amplifier according to the present invention.

What is claimed is:

1. A light amplifier interposed between an input side optical fiber and an output side optical fiber, comprising:
   a Raman excitation section for backwardly Raman-exciting said input side optical fiber;
   a first discrete light amplifier capable of carrying out a discrete amplification of light from said input side optical fiber and Raman-amplified by the exiting light from said Raman excitation section;
   a dispersion compensating fiber Raman amplifier capable of, while dispersion-compensating the light amplified by said first discrete light amplifier in a dispersion compensating fiber, Raman-amplifying the light propagating in said dispersion compensating fiber; and
   a second discrete light amplifier capable of carrying out a discrete amplification of the light from said dispersion compensating fiber Raman amplifier,
   wherein the level of light outputted from said second discrete light amplifier is set so that a first upper limit value set based on the amount of waveform deterioration caused by the nonlinear optical effect due to said output side optical fiber is not exceeded.

2. The light amplifier according to claim 1, wherein the gain of said dispersion compensating fiber Raman amplifier is set so that the interference noise caused by the double Rayleigh scattering is suppressed while the loss of the light due to said dispersion compensating fiber is being compensated.

3. The light amplifier according to claim 2, wherein the level of the light outputted from said dispersion compensating fiber Raman amplifier is set so that a second upper limit value set based on the amount of waveform deterioration caused by the nonlinear optical effect due to said dispersion compensating filter is not exceeded.

4. The light amplifier according to claim 1, wherein the level of the light outputted from said second discrete light amplifier is set so that the first upper limit value set based on the amount of waveform deterioration caused by the nonlinear optical effect due to said output side optical fiber is not exceeded,
   the gain of said dispersion compensating fiber Raman amplifier is set so that the interference noise caused by the double Rayleigh scattering is suppressed while the loss of light due to said dispersion compensating fiber is being compensated, and
   the level of the light outputted from said dispersion compensating fiber Raman amplifier is set so that the second upper limit value set based on the amount of waveform deterioration caused by the nonlinear optical effect due to said dispersion compensating fiber is not exceeded.

5. The light amplifier according to claim 4, wherein the gain of said second discrete light amplifier is set as a gain being amplified from the level set as a level of the light outputted from said dispersion compensating fiber Raman amplifier to the level set so that said first upper limit value is not exceeded.

6. The light amplifier according to claim 5, wherein the gain of said first discrete light amplifier is set so that said first discrete light amplifier amplifies the light Raman-amplified by said exciting light from said Raman excitation section up to the level of the light inputted to said dispersion compensating fiber Raman amplifier, which is derived from the gain of said dispersion compensating fiber Raman amplifier and the setting of the level of the light outputted from said dispersion compensating fiber Raman amplifier.

7. The light amplifier according to claim 1, wherein the intensity of said exiting light from said Raman excitation section is set to equal or less than about 500 mW.

8. The light amplifier according to claim 1, wherein said first discrete light amplifier and said second discrete light amplifier are constituted of a first rare earth doped light amplifier and a second rare earth doped light amplifier, respectively.

9. The light amplifier according to claim 1, wherein the light amplified by said exiting light from said Raman excitation section is wavelength division multiplexed light and when the output level per wavelength channel is equal to or greater than the −3 dBm and the gain of the whole light amplifier is equal to or greater than 25 dB, the effective noise figure of the whole light amplifier is set to 2 dB or less.

10. A light amplifying method, comprising the steps of:
    carrying out a first Raman amplification of the light propagating in the input side optical fiber;

carrying out a first discrete amplification of the light inputted from said input side optical fiber and said first Raman-amplified;

carrying out a second Raman amplification of the light propagating in said dispersion compensating fiber while dispersion-compensating the light for which said centralized type amplification has been carried out in the dispersion compensating fiber; and carrying out a second discrete amplification of the light for which said dispersion compensation and said second Raman amplification have been carried out and outputting the light to the output side optical fiber, wherein the level of the light obtained by said second discrete amplification is set so that the first upper limit value set based on the amount of waveform deterioration caused by the nonlinear optical effect due to said output side optical fiber is not exceeded.

11. The light amplifying method according to claim 10, wherein the level of the light obtained by said second discrete amplification is set so that the first upper limit value set based on the amount of waveform deterioration caused by the nonlinear optical effect due to said output side optical fiber is not exceeded, the gain obtained by said second Raman amplification is set so that the interference noise caused by the double Rayleigh scattering is suppressed while the loss of the light due to said dispersion compensating fiber is being compensated, and the level of the light obtained by said second Raman amplification is set so that the second upper limit value set based on the amount of waveform deterioration caused by the nonlinear optical effect due to said dispersion compensating fiber is not exceeded.

12. The light amplifying method according to claim 11, wherein the gain obtained by said second discrete amplification is set as a gain being amplified from the level set as a level of the light obtained by said second Raman amplification to the level set so that said first upper limit value is not exceeded.

13. The light amplifying method according to claim 11, wherein the gain obtained by said first discrete amplification is set so that the level of the light obtained by said first Raman amplification is amplified up to the level of the light inputted to said dispersion compensating fiber Raman amplifier, which is derived from the gain obtained by said second Raman amplification and the setting of the level of the light obtained by said Raman amplification.

14. The light amplifying method according to claim 10, wherein the intensity of the exciting light for said first Raman amplification is set to equal or less than about 500 mW.

15. The light amplifying method according to claim 10, wherein the output of said exciting light in said Raman excitation section is controlled to be constant, the power of the output light is obtained by said first discrete amplification is controlled to be constant;

the power of the output light obtained by said second Raman amplification is controlled to be constant; and the power output light obtained by said second discrete amplification is controlled to be constant.

* * * * *